United States Patent

[11] 3,594,869

[72] Inventor Fred D. Sher
40 Normandy Road, Clifton, N.J. 07013
[21] Appl. No. 800,567
[22] Filed Feb. 19, 1969
[45] Patented July 27, 1971

[54] INJECTION MOLDING MACHINE
9 Claims, 5 Drawing Figs.
[52] U.S. Cl. .................................................. 18/30 LF,
18/30 LB
[51] Int. Cl. .................................................. B29f 1/06
[50] Field of Search ............................................ 18/30 LKS,
30 CK, 30 LM, 30 LV, 30 QB, 30 I, 42, 30 LB, 30
LD, 30 LF

[56] References Cited
UNITED STATES PATENTS
2,577,412 12/1951 Ferrell .......................... 18/42 X
3,174,187 3/1965 Schriever ..................... 18/30

*Primary Examiner*—J. Spencer Overholser
*Assistant Examiner*—Norman E. Lehrer
*Attorney*—Breitenfeld & Levine ABSTRACT: Stationary framework carries stationary mold part. Movable mold part carried by injection assembly slidable on framework toward and away from stationary mold part, mold parts defining a closed cavity when they meet. Injection assembly includes chamber containing molten plastic, and a ram is movable with respect to framework into and out of chamber. Cross-sectional area of ram larger than cross-sectional area of mold cavity so that ram pressure simultaneously holds mold parts closed and injects plastic into cavity.

PATENTED JUL 27 1971

INVENTOR:
FRED D. SHER
BY
Breitenfeld & Levine
ATTORNEYS

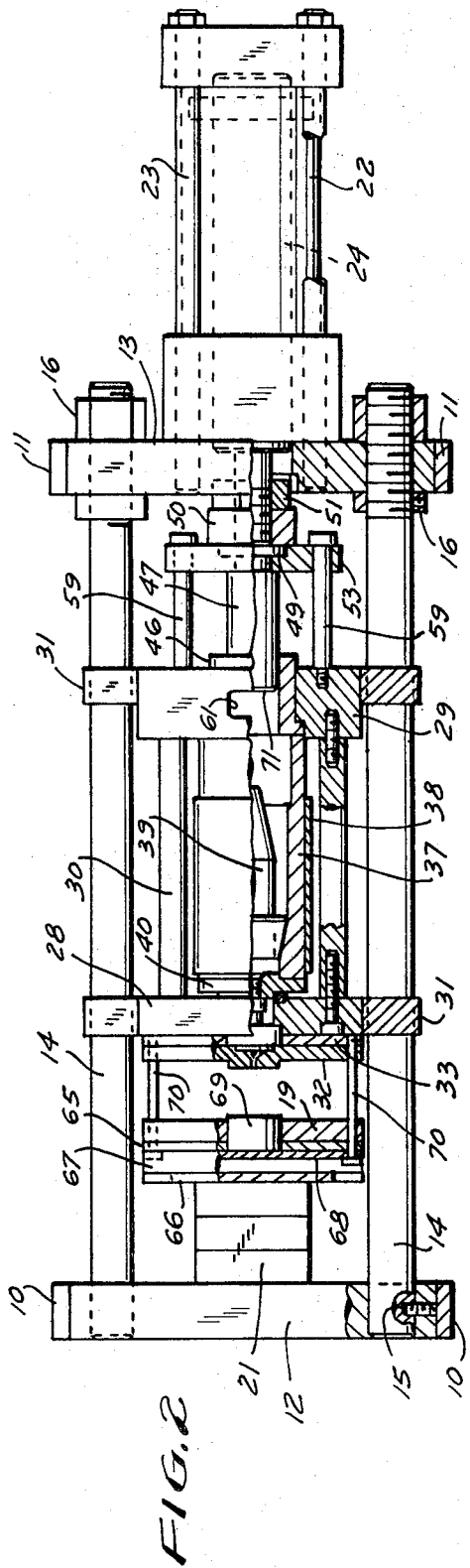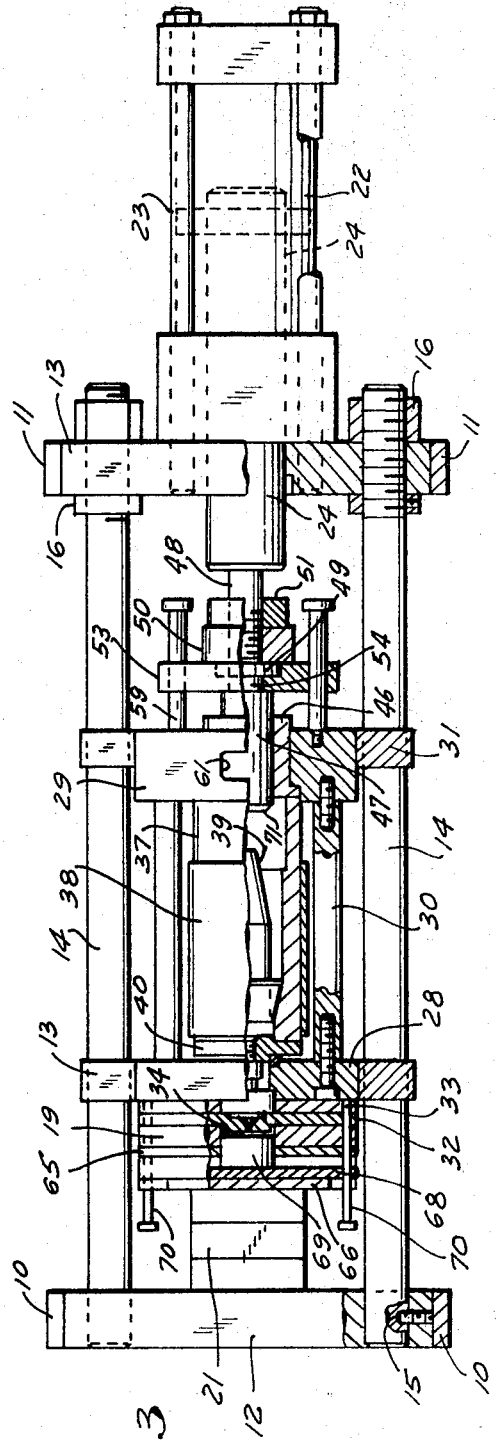

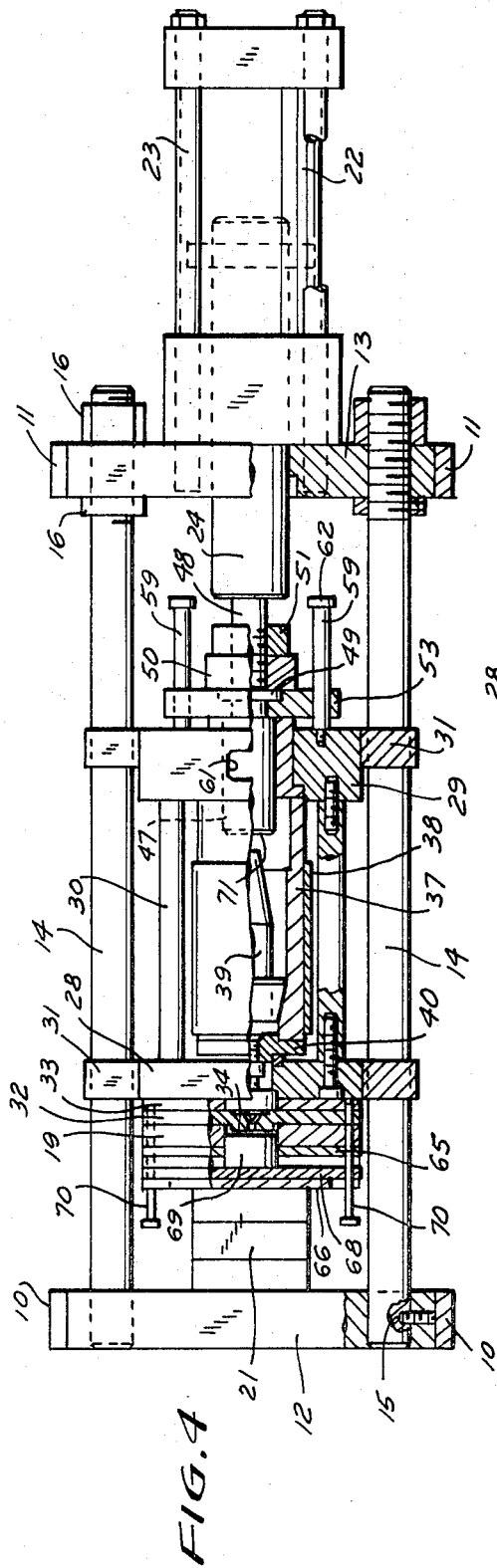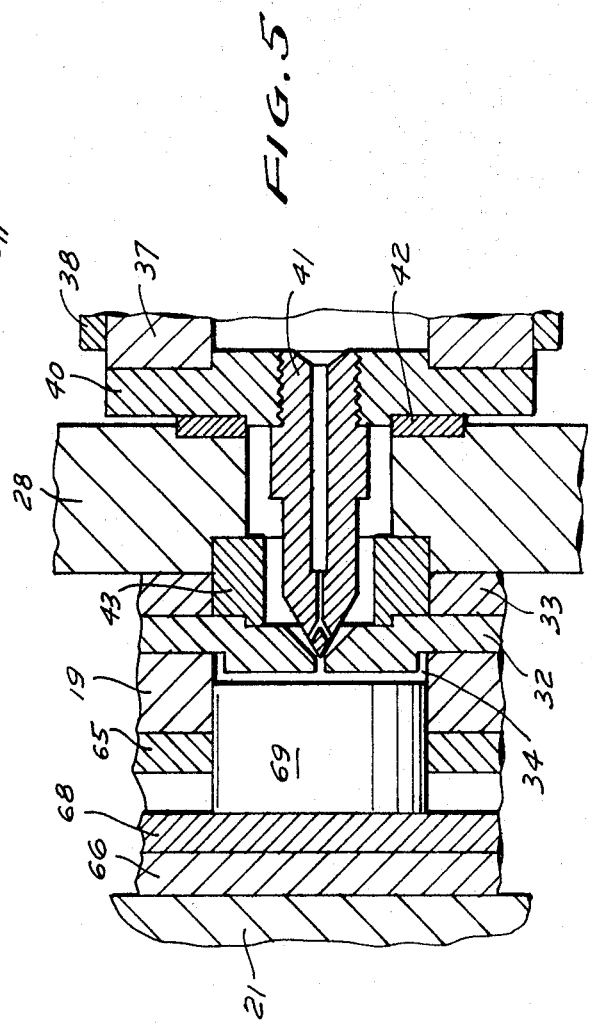

INJECTION MOLDING MACHINE

This invention relates to injection molding machines, and more particularly to such an apparatus for producing only one, or at most a few, relatively small articles during each molding cycle of the machine.

In a typical injection molding machine, two separate actuators, e.g., hydraulic piston-cylinder devices, are provided. One of these actuators serves to move the divided mold parts together to close the mold, thereby creating a closed mold cavity or cavities, and to thereafter move the mold parts away from each other to open the mold so that the molded article may be removed from it. The other actuator comes into play after the mold has been closed and serves to inject molten plastic into the mold cavity. Machines of this type are highly versatile since they can accommodate and operate with molds having few or many cavities, and molds for making large or small articles. On the other hand, to insure this versatility, these machines have usually been made large and heavy, and hence costly, as well as mechanically complex, and consequently slow operating.

In recent years, a need has arisen for special purpose injection molding machines capable of utilizing molds which produce no more than a few relatively small articles during each molding cycle. With such molds, the large capacity and versatility of conventional machines are to a great extent wasted.

It is therefore a general object of the present invention to provide an injection molding machine ideally suited to producing one or at most a few relatively small molded plastic articles during each machine cycle.

It is another object of the invention to provide such a machine which is much smaller and simpler in construction, and hence less costly and faster operating, than conventional molding machines.

It is a further object of the invention to provide an injection molding machine wherein a single actuator serves both to close the mold (and hold it closed) as well as to inject molten plastic into the mold cavity.

Most injection molding machines, including the machine of the present invention, include a heated chamber within which plastic is maintained in molten condition preparatory to being injected into the mold cavity or cavities. A ram is provided which enters the chamber to drive the plastic into the mold cavity, at the appropriate time during the machine cycle, and which thereafter leaves the chamber to permit a fresh charge of plastic to enter. The present invention is based upon the realization that in pressurizing the molten plastic in the heated chamber, the ram is providing a force which can be utilized to hold the two mold parts closed. However, and more important, it has been discovered that the ram force can successively be used to hold the mold closed only if it exceeds the force tending to open the mold which is produced by the pressure of the molten plastic within the mold cavity.

To accomplish this relationship of forces, it has been found that the area of the operative face of the ram, i.e., the cross-sectional area of the ram in a plane perpendicular to its direction of movement, must exceed the largest total cross-sectional area of the mold cavity or cavities in a plane parallel to the plane along which the mold parts separate. The reason is that, since the molten plastic is a liquid, the pressure throughout its volume is substantially equal at all points. Consequently, if the cross-sectional area of the ram exceeds the cross-sectional area of the mold cavity, the force transmitted by the ram will exceed the force on the mold parts tending to open the mold, since the pressures of the plastic on the face of the ram and within the mold cavity are equal. This excess force is used, according to this invention, to hold the mold parts together.

A feature of the invention is that its simplicity of construction permits the heating chamber and ram to be readily removed from the machine and then replaced by the same or a different heating chamber outfitted with a ram having a different cross-sectional area. In this way, the machine can be adapted for optimum performance with molds having cavities of different cross-sectional areas.

Additional features and advantages of the invention will be apparent from the following description in which reference is made to the accompanying drawings.

In the drawings:

FIG. 2 is a top plan view of the machine with the mold open;

FIG. 3 is a top plan view of the machine with the mold closed but prior to injection of plastic into the mold cavity;

FIG. 4 is a top plan view of the machine after injection of the plastic; and

FIG. 5 is an enlarged fragmentary cross-sectional view of the closed mold and nozzle through which molten plastic flows into the mold cavity.

Figure 1:
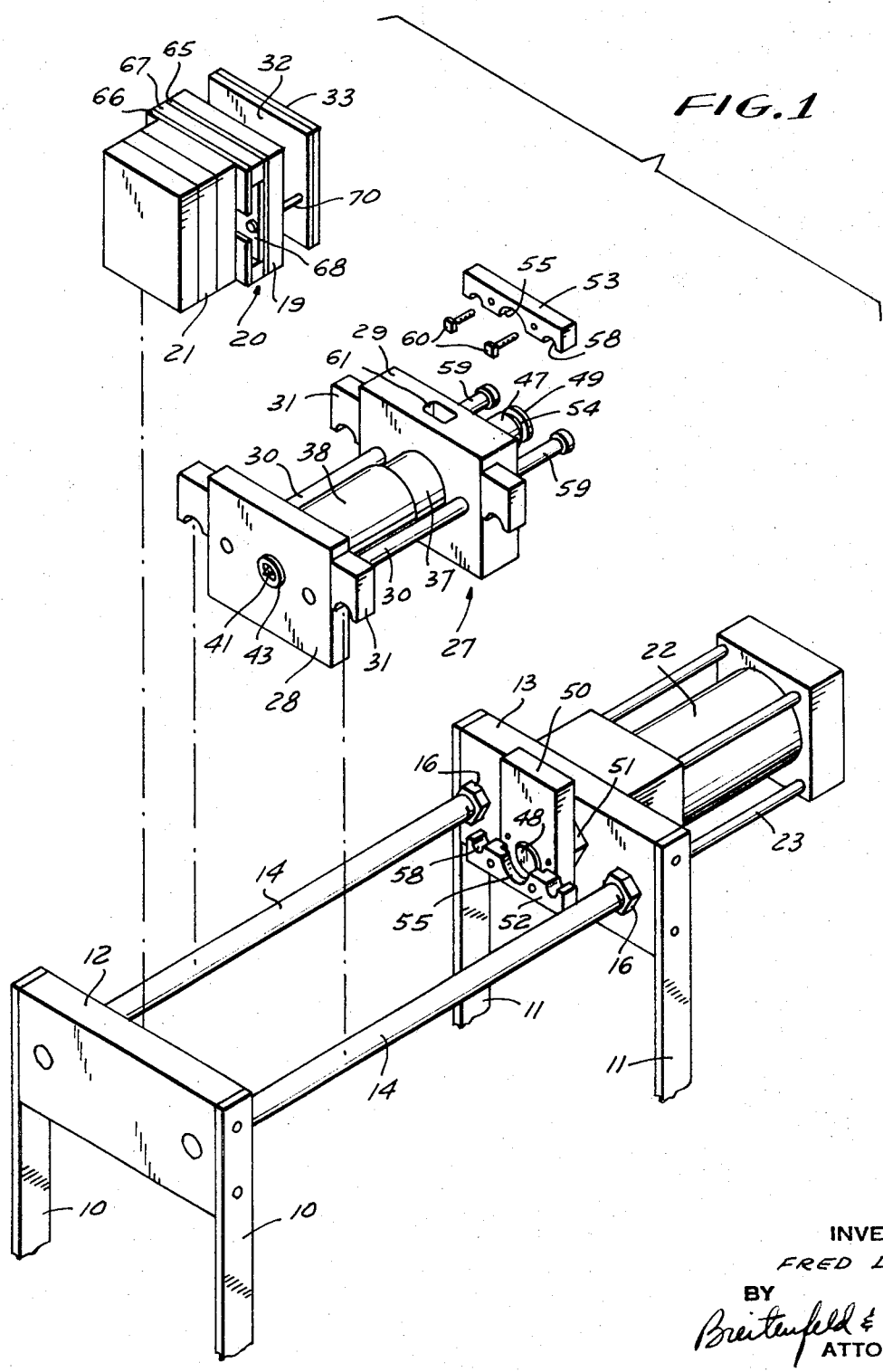
FIG. 1 is an exploded perspective view of an injection molding machine according to this invention.

The injection molding machine chosen to illustrate the present invention includes a stationary framework having two pairs of uprights 10 and 11. Fixed between the upper ends of the uprights 10 is a stationary platen 12, and similarly fixed between the upper ends of the uprights 11 is a stationary mounting plate 13. A pair of horizontal, spaced-apart rails or tie rods 14 extend between the platen 12 and plate 13. In the present example, each rail 14 has a circular cross section, is threaded into the platen 12, relative rotation being prevented by a setscrew 15, and is secured to the plate 13 by nuts 16.

Mounted on the stationary platen 12 is a stationary mold part 19, an ejector pin assembly 20 (FIG. 1), and spacer blocks 21 located between the mold part and platen. A hydraulic piston-cylinder device 22 is secured to the mounting plate 13 by means of support blocks and rods 23, and is adapted to move a piston rod 24 along a path parallel to the rails 14. The piston-cylinder device 22 serves, in the present illustration, as the sole actuator for closing and opening the mold, as well as for injecting plastic into the mold cavity. For the sake of simplicity, the conduits through which hydraulic fluid flows to and from the device 22 have not been illustrated.

Slidably supported on the rails 14, for movement toward and away from the stationary mold part 19, is an injection assembly 27 (FIG. 1). The injection assembly comprises a carriage including a movable platen 28 and a feed block 29 maintained in a fixed spaced relationship by two horizontal rods 30. Projecting laterally from the side edges of the platen 28 and block 29 are bearings 31, each bearing having a semicircular groove in its lower edge for slidably accommodating one of the rails 14. Mounted on the outer face of the movable platen 28 is a movable mold part 32, an ejector actuator plate 33 being located between the mold part 32 and platen 28. (In FIG. 1, the mold part 32 is shown separated from platen 28 for clarity of illustration; in fact, however, the mold part 32 is fixed to platen 28). When the mold parts 19 and 32 are brought into engagement, i.e., when the mold is closed, the parts define a closed cavity 34 (FIGS. 3—5) within which the plastic article (not shown) is formed.

Located between the platen 28 and block 29 is a cylindrical chamber 37 within which plastic material is maintained in a molten condition preparatory to its being injected into the closed mold cavity 34. The chamber is heated electrically by an external annular heater 38 and an internal spreader 39. Fitted against one end of the chamber 37 is a nozzle plate 40 threadedly carrying a nozzle 41 (FIG. 5) through which molten plastic is delivered to the cavity 34. A washer 42 of heat insulation material surrounds the nozzle 41 and separates the relatively hot nozzle plate 40 from the cooler movable platen 28. In addition, the face of platen 28 opposite the washer 42 carries a projecting ring 43 which helps to locate the movable mold part 32 properly when the latter is being mounted on the platen 28.

The other end of the chamber 37 seats within one edge of a through opening in the feed block 29. The remainder of the opening is lined by a bushing 46 which snugly but slidably accommodates a ram 47. The outer end of the ram 47 is connected to the reduced diameter, externally threaded end 48 of the piston rod 24. To help accomplish this connection, the ram presents an enlargement 49, the enlargement being formed in the present example by providing an annular groove 54 close to the outer end of the ram. A block 50, having an internally threaded bore is threadably secured to the end 48 of piston rod 24, and fixed in place thereon by a nut 51. Secured to the block 50 by screws is a coupling block split horizontally into a lower half 52 (FIG. 1) and an upper half 53, these halves being the mirror image of each other. At the center of each coupling block half is a semicircular cutout 55 adapted to be accommodated within the annular groove 54 of the ram, the cutout 55 being enlarged at its face adjacent to the block 50 to accommodate the enlargement 49 on the end of the ram. It will be appreciated therefore, that with the ram end sandwiched between the coupling block parts 52 and 53, and these block parts screwed to the block 50, a connection is effected between the ram 47 and the piston rod 24, 48. Each coupling block half is also formed with lateral semicircular cutouts 58 which, when the block parts 52 and 53 are in operative position, form holes for slidably accommodating a pair of shoulder bolts 59 extending from the feed block 29.

Because of the structural simplicity of the present invention, it is a simple matter to remove the injection assembly 27 and ram 47 from the machine and replace them with a different injection assembly and ram, or change only the ram and then replace the assembly 27 and new ram. This is achieved by unscrewing the screws 60 (FIG. 1) and removing the coupling block half 53 from block 50. Once this is done, the injection assembly 27 and ram 47 may be lifted off the rails 14. If the ram above is to be replaced, it is slipped out of the bushing 46, the bushing 46 is replaced with a bushing having a size conforming to the diameter of the new ram, the new ram is inserted into the bushing, the injection assembly replaced on the rails 14, and the block half 53 reattached to the block 50. The new ram will have an enlargement and adjacent portion corresponding in size to the enlargement 49 and groove 54 so that it cooperates with the coupling block 52, 53.

Each cycle of operation of the machine begins with the parts as shown in FIG. 2. The piston rod 24, ram 47, and injection assembly 27 are all in their rightwardmost positions, and the mold parts 19 and 32 are separated. At a time early in the cycle, a charge of plastic material, which may be in powder form, is delivered through the feed opening 61, in the feed block 29, into the bushing 46 which defines the entrance to the chamber 37. Upon actuation of the piston-cylinder device 22, the piston rod 24 moves toward the left. During the initial portion of this movement, the ram 47 moves a short distance into the chamber 37 until it bears on the plastic material therein, and thereafter the injection assembly 27 moves to bring the movable mold part 32 into engagement with the stationary mold part 19 so as to close the mold (FIG. 3). This movement of the injection assembly is produced because the molten plastic material within the chamber is viscous enough to transmit, from the ram to the injection assembly, the relatively small force required to slide the injection assembly along the rails 14. The viscosity is also high enough to prevent any plastic from squirting out of the nozzle 41 during this initial movement.

Upon continued leftward movement of the piston rod 24, the injection assembly remains stationary, but the ram 47 moves further into the cylinder pushing the new charge of plastic before it and injecting molten plastic already in the chamber through the nozzle into the closed cavity or cavities 34 (FIG. 4). At the same time, the coupling block 52, 53 moves leftward of the shoulders 62 to the bolts 59. This completes the leftward movement of the piston rod 24, and after a short delay to permit the plastic in the mold cavity to cool and harden the device 22 is actuated to return the piston rod toward the right. Initially, only the ram 47 moves out of the chamber 37 and the coupling block again returns to engagement with the bolt shoulders 62 (FIG. 3). Continued rightward movement of the piston rod is transmitted via the shoulder bolts 59 to the injection assembly 27, and the latter returns to its rightward position shown in FIG. 2, causing the mold to open. At this time, the ejector pin assembly 20 comes into play.

The assembly 20 includes a pair of fixed plates 65 and 66 held in spaced relation by spacers 67. An ejector plate 68 is slidably arranged between the plates 65 and 66, and carries an ejector pin 69 snugly but slidably fitted into a through hole in stationary mold part 19. Two studs 70 having heads at their free ends, project from the ejector actuator plate 33 and pass slidably through holes in the ejector plate 68. Springs (not shown) urge the ejector plate 68 toward the fixed plate 66 so as to retract the ejector pin 69 out of the cavity 34 (FIGS. 3 and 4). However, during the final portion of each machine cycle, the heads of the studs 70, moving rightwardly with the injection assembly, engage the ejector plate 68 and move it rightwardly, against the force of the springs. Consequently, the ejector pin 69 moves into the cavity portion formed in the stationary mold part 19 and pushes the molded article out of the cavity. The molded article may fall on to a conveyor moving beneath the mold part 19.

According to this invention, the area of the operative face 71 of the ram, which is equal to the ram's cross-sectional area, is larger than the largest area of the cavity 34 in a plane parallel to the plane along which the mold sections 19 and 32 part, i.e., a plane perpendicular to the direction of movement of the ram 47. For example, if the largest cross-sectional area of the cavity 34 is three-fourths of a square inch, a one inch diameter ram 47, having a cross-sectional area of almost eight-tenths of a square inch, may be employed. As mentioned above, the leftward movement of the ram 47 is transmitted to the injection assembly, and hence to the movable mold part 32, by the liquified plastic within the chamber 37. Since the pressures at all points in a liquid volume are equal, when the parts are in the position shown in FIG. 4, the pressure on the ram face 71 equals the pressure within the cavity 34. However, since the cross section area of the cavity is smaller than the ram face area, the rightward force on the movable mold part 32, tending to open the mold, is less than the leftward force produced by the ram face 71 on the molten plastic. This excess leftward force, acting through the plastic on the injection assembly, serves to hold the movable mold part 32 against the stationary mold part 19 to thereby hold the mold closed. It should be noted that no additional means for holding the mold closed is needed.

It may be mentioned that the conventional electrical circuits, including switches, valves, motor, pump, etc. to cycle the machine as described above, have been omitted for the sake of simplicity.

The invention as been shown and described in preferred form only, and by way of example, and it is understood, therefore, that many variations may be made in the invention which will still be comprised within its spirit.

I claim:

1. A molding machine comprising a stationary mold part, an injection assembly movable toward and away from said stationary mold part, a movable mold part between said stationary mold part and said injection assembly and movable in a direction parallel to the direction of movement of said assembly into and out of engagement with said stationary mold part in response to movements of said injection assembly, said mold parts defining a closed mold cavity when they meet, said injection assembly including a chamber for containing molten plastic, and a ram movable into and out of said chamber in a direction parallel to the direction of movement of said assembly, the cross-sectional area of said ram being larger than the area of said mold cavity in a plane perpendicular to the direction of movement of said assembly and ram, whereby movement of said ram toward said stationary mold part initially causes said assembly to move toward said stationary mold part until said movable and stationary mold parts meet and continued movement of said ram simultaneously forces molten plastic from said chamber into said mold cavity and holds said mold parts together, said ram serving as the only force-producing part of said machine serving to hold said mold parts together during molding.

2. A molding machine as defined in claim 1 wherein said movable mold part is mounted on and moves with said injection assembly.

3. A molding machine as defined in claim 2 including means carried by said injection assembly through which said mold cavity communicates with the interior of said chamber.

4. A molding machine as defined in claim 1 including a stationary framework upon which said stationary mold part is mounted, said framework including at least one rail, said injection assembly being slidably supported on said rail.

5. A molding machine as defined in claim 4 including a pair of said rails, driving means on said framework for moving said ram, and means for connecting said driving means to said ram, said connection means being the only means connecting said injection assembly and ram to said framework, whereby when said connection means is disconnected said injection assembly and ram can be lifted off said rail and replaced with an injection assembly having a ram of different size.

6. A molding machine as defined in claim 5 including at least one bearing projecting laterally from each side of said injection assembly, each bearing resting slidably on one of said rails and being devoid of any portion facing the underside of its respective rail, whereby said bearings do not interfere with lifting of said injection assembly from said rails.

7. A molding machine as defined in claim 5 wherein said driving means includes a movable piston and a piston rod for transmitting movements of said piston to said ram, and said connection means includes a member engaging said ram and removably secured to said piston rod, said member and ram carrying means cooperable to transmit movement of said piston rod away from said stationary mold part to said ram.

8. A molding machine as defined in claim 7 including a second member secured to said piston rod below said removable member, said ram being sandwiched between said members, and a pin projecting from said injection assembly and slidably arranged between said members, said pin and at least one of said members carrying means cooperable to transmit movement of said piston rod away from said stationary mold part to said injection assembly.

9. A molding machine as defined in claim 8 including ejector means movable into the cavity portion of said stationary mold part for ejecting molded articles therefrom upon completion of the molding cycle, and means carried by said injection assembly for actuating said ejector means upon movement of said assembly away from said stationary mold part.